May 29, 1956  R. P. FOUCHÉ  2,747,512
MOTOR PUMP
Filed May 22, 1952  3 Sheets-Sheet 1

René Paul Fouché
INVENTOR.

BY *Clarence A. O'Brien*
*and Harvey B. Jacobson*
Attorneys

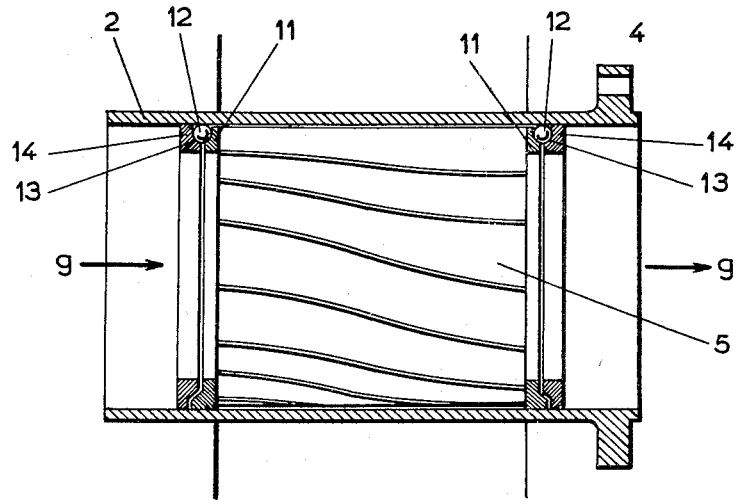
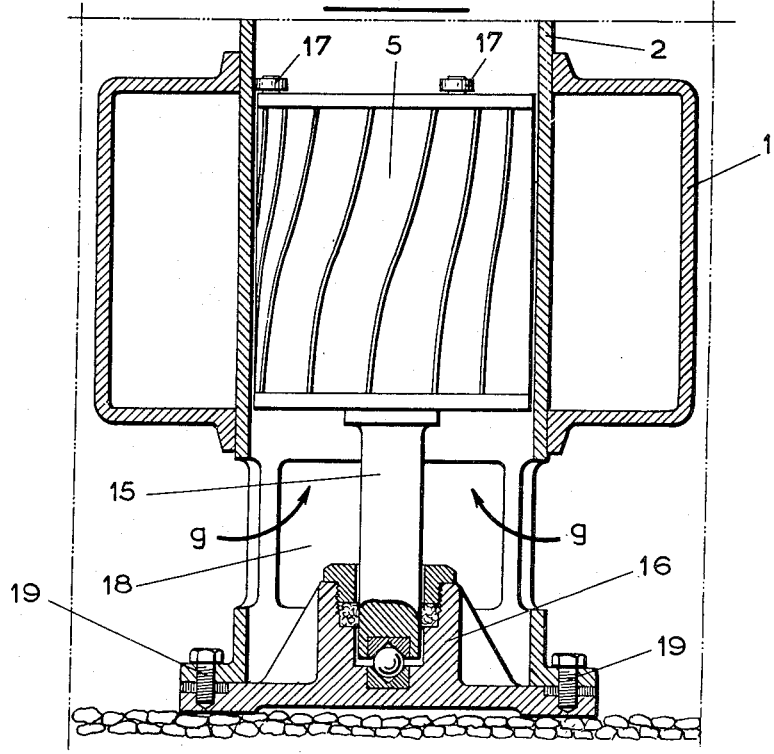

May 29, 1956 R. P. FOUCHÉ 2,747,512
MOTOR PUMP
Filed May 22, 1952 3 Sheets-Sheet 3

René Paul Fouché
INVENTOR.

BY
Attorneys

United States Patent Office 2,747,512
Patented May 29, 1956

2,747,512

MOTOR PUMP

René Paul Fouché, Paris, France

Application May 22, 1952, Serial No. 289,381

Claims priority, application France May 24, 1951

2 Claims. (Cl. 103—87)

My invention has for its object an improved pumping rotor incorporated to an electric induction motor, said rotor being adapted to provide for the pumping of any liquid or gasiform fluid or even for the pumping of a more or less pasty mixture propelled through the rotor or over the periphery thereof by the very movement of said pumping rotor.

My improved pumping rotor revolves inside a channel through which the fluid to be pumped is constrained to flow while the stator of the induction motor driving its rotor forming the pumping rotor surrounds this channel and the rotor therein.

According to a particular feature of my invention, the cross-section of the channel carrying the stator under sufficient frictional conditions is constituted by a fluid-tight sleeve, made of magnetic material or otherwise, which occupies in a substantially complete manner the gap between the rotor and the stator, said sleeve forming what may be termed a gap-filling sleeve.

The accurate fitting of the outer diameter of said sleeve with reference to the poles of the stator provides a magnetic engagement with a minimum clearance while allowing the stator to be readily withdrawn through a mere sliding thereof over the outer surface of the sleeve. The stator is prevented from rotating around the sleeve and the rotor element by a suitable attachment or mounting on the said sleeve.

In order to allow the rotor to act as a pumping rotor, said rotor is preferably constituted in accordance with my invention by a squirrel cage, the conductive bars of which that are solid in conventional structures being replaced by tubular members or pipe-sections, the general shape and cross-section of which are defined through the application of the well known laws governing the flow of fluids and are a function on one hand of the nature of the liquid, gasiform or pasty fluid to be pumped and on the other hand, of the flow rate required and finally of the delivery head or pressure of the pump. These tubular members the walls of which are electrically conductive form actual guiding blades and I will term them, hereinafter, tubular blade members. The thickness of the walls of said tubular members is defined through calculation of their electric properties, taking into account chiefly the data concerning the complete motor.

The tubular blade members are housed at the periphery of a system of piled-up magnetic sheets that are insulated with reference to one another and that form the mass of the rotor.

The shaft of the squirrel cage may revolve in bearings carried by the gap-filling sleeve, said bearings being held by suitably shaped arms that provide the smallest resistance possible against the flow of fluid propelled within the gap-filling sleeve.

It is possible to simplify this structure by eliminating the rotor shaft, the rotor revolving inside self-centering thrust bearings provided at its ends. In a preferred embodiment, these thrust bearings are arranged on either side of the rotor and include a ring integral with or attached to the periphery of the rotor and provided for instance with three recesses, 120° apart, each of which may house a ball bearing on a ring integral with the gap-filling sleeve and forming a stationary race.

It is also possible, when the rotor revolves around a vertical axis, to mount it on a vertical shaft or trunnion and for this purpose, its lower end is provided with a stub-shaft resting on a stepped thrust bearing while the upper rotor end carries rolling and centering members bearing against the inner surface of the gap-filling sleeve.

In a modification, the fluid to be pumped is propelled no longer by tubular members as first disclosed but by a screw conveyor or like member arranged either axially within the rotor or along the periphery thereof, in which latter case the threads of the screw conveyor are formed within the thickness of the periphery of the rotor or else are constituted by inserts that are made rigid through any suitable means with said periphery of the rotor.

It should be remarked that in this latter modification, the electrical drive of the rotor is ensured through the conventional solid conductive bars of the squirrel cage. However, for high power units, it is possible to provide, instead of the said conductive bars coils housed inside notches formed at the periphery of the rotor sheets.

My invention also has for its object an electric pump of the axial type incorporating a pumping rotor of the type disclosed, said electric pump forming a single unit associating the induction motor, the pump and the coupling means between the motor and the pump.

This compact and simple structure leads to a considerable reduction in the cost price of the electric pump and allows a wide variety of applications thereof.

The electric pump forming the object of my invention may also be designed as a portable pump that may be completely immersed, say inside a well, provided the stator is made fluidtight; this stator is fitted over the gap-filling sleeve containing the centrifugal pumping rotor and there is fitted over the lower end of the pipe a strainer. This arrangement forms a very simple, light and easily controlled pump the mounting and the dismantling of which are extremely easy.

In order to allow my invention to be readily understood, I will now describe a preferred embodiment thereof, reference being made to accompanying drawings, wherein:

Fig. 3 is an elevational view partly in section of a modified pumping device having no actual shaft.

Fig. 4 is an elevational view, partly in cross-section of a further modification of the electric pump, the rotor of which is arranged vertically.

Figure 1:
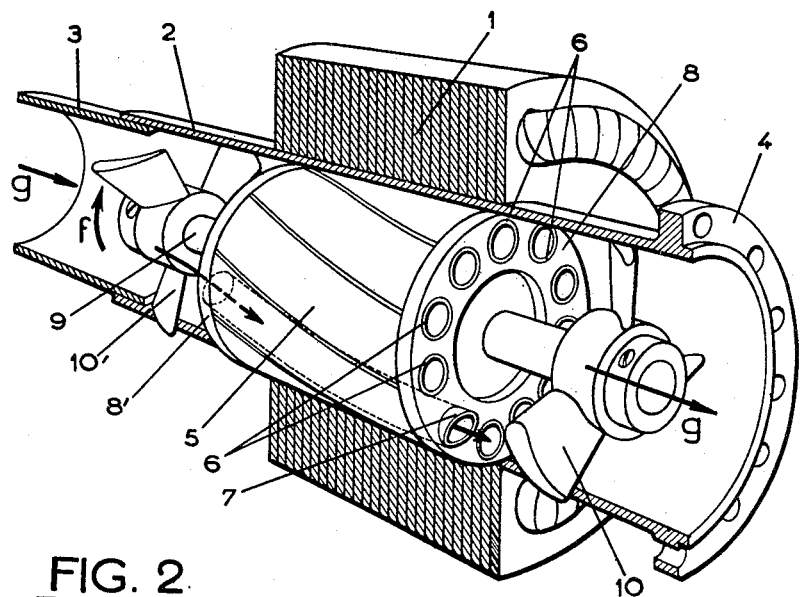
Fig. 1 is a perspective view of an electric pump according to my invention, part of which is shown in section, the section being taken along an axial plane.

Turning to Fig. 1, it is apparent that the electric pump forming the object of the invention includes chiefly a stator 1 that is fitted with slight friction over a gap-filling sleeve 2 which is fitted in its turn over the end of a pipe 3 inside which flows the fluid to be pumped.

In the embodiment described, a section of the pipe 3 is fitted to one end of and inside the sleeve 2 so as to make the fitting of the stator easier while the other end of the sleeve is made rigid with the other section of the pipe 3, that is not illustrated, through the agency of a flange 4 which is rigidly secured to a corresponding flange on said other pipe section by means of bolts, with the interposition of a suitable fluidtight packing.

The liquid or gasiform fluid flowing through the pipe 3 is propelled as it passes through the pumping rotor 5 by the actual movement of said rotor the outer surface of which is carefully trued so that the gap between the stator and the rotor may be filled by the sleeve 2, the thickness of which is such as to leave an air gap just forming the clearance required for rotation of the rotor. The pumping rotor 5 is of the squirrel cage type and there are distributed at its periphery a series of tubular blade members 6, made of red copper or the like electrically conductive metal, said tubular blade members forming both the conductive members of the squirrel cage and the blades that serve for the propulsion of the fluid inside the pipe 3.

The tubular blade members have a cross section shaped in conformity with the laws of hydraulics, i. e. their shape is a function of the nature of the fluid to be propelled, of the rate of flow and of the delivery head or pressure of the pump at the delivery end.

On the other hand, the longitudinal shape of the tubular blade members 6 i. e. the shape of their generatrices is defined in this particular case by calculation based on the theory of hydraulics.

It should also be remarked that at the output or delivery end, the tubular blade members 6 may include advantageously a projecting portion 7, the curvature of which is defined by the shape of the triangle of composition of the speeds at the output end of each tubular blade member.

Figure 2:
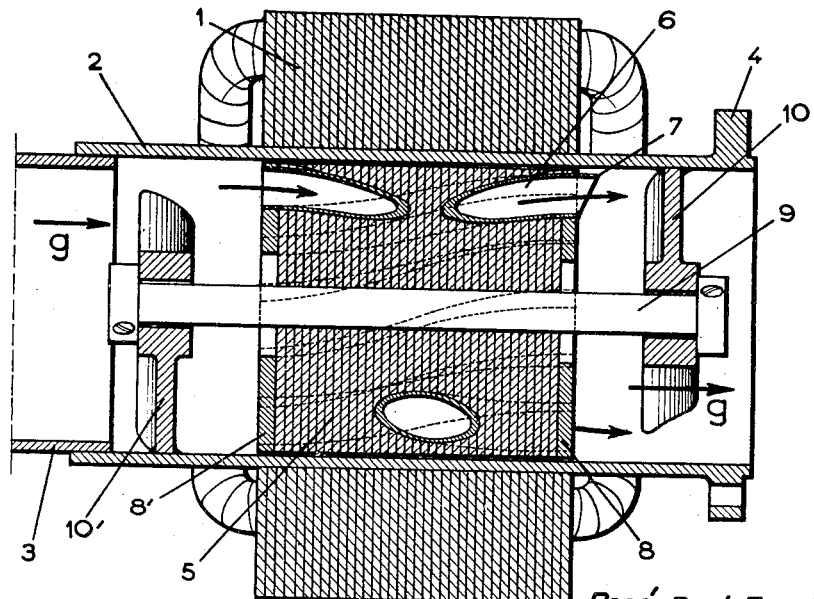
Fig. 2 is an axial cross-section of the electric pump according to Fig. 1.

This extension of the output ends of the tubular blade members has for its object an improvement in the efficiency of the pump; it is shown only once for sake of clarity in the drawing at 7 in Figs. 1 and 2.

It should be still further remarked that the tubular blade members 6 play the same part as the bars of a conventional squirrel cage of an induction motor, as provided by electric calculation of the data of said bars.

The ends of the tubular blade members engage openings of a same diameter provided in two conductive annular plates 8 and 8' to which they are welded. These annular plates 8 and 8' closing the ends of the rotor are made of the same electrically conductive metal as the tubular blade members, or of another electrically conductive metal according to the application to be considered.

The rotor 5 is mounted on a spindle 9 revolving inside roller bearings not illustrated that are housed inside bearings 10 and 10' mounted inside the gap-filling sleeve to which they are rigidly secured through welding for instance; these bearings include substantially radial arms the outline and annular direction of which are designed so as to provide a minimum resistance for the fluid to be propelled as it passes into and out of the tubular blade members.

The operation of the electric pump illustrated in Figs. 1 and 2 is as follows: as soon as current is fed to the stator 1 which may be a conventional stator of the one-phase, two-phase or the like type, the tubular blade members 6 forming the squirrel cage of the rotor 5 drive the rotor, say in the direction of the arrow f of Fig. 1. The fluid is thus drawn in and propelled through the pumping rotor and flows in the direction of the arrows g through the pipe 3 and into the tubular blade members in the rotor.

It will readily be ascertained that the electric pump that has just been described is of an extremely simple design and that it allows the pumping of more or less corrosive products. As a matter of fact, the coils of the stator are housed completely outside the pipe conveying such products. On the other hand, in the case of an acid fluid, the rotor system including the shaft and the bearings is made of stainless steel, the red copper parts and the magnetic sheets being protected against the corrosive fluid. In the modification illustrated in Fig. 3, the rotor is not provided with a shaft and it is possible to eliminate the bearings 10—10' and to reduce the disturbance of the flow of fluid to be pumped to a minimum.

In this embodiment, the rotor 5 carries accordingly at either end a ring 11 provided along its periphery with three recesses arranged at 120° from one another which serve as seats for balls 12 bearing on one hand against the inner surface of the gap-filling sleeve 2 and on the other hand against a suitably shaped annular thrust surface 13 formed on a stationary bearing ring 14 rigidly secured through welding or otherwise to the gap-filling sleeve 2. The rotor 5 thus revolves between two self-centering thrust bearings provided at each end of the rotor inside the gap-filling sleeve 2.

In a further embodiment illustrated in Fig. 4, the electric pump is of the type including a vertical rotor whereby it is possible to carry said rotor, inside its gap-filling sleeve over a vertical pivot constituted by the stubshaft 15 revolving over a step-bearing 16, the lower carrier member of which bears on the ground for instance.

The upper end of the rotor 5 is provided at its periphery with three rollers 17 shifted by 120° with reference to each other and adapted to roll over the inner surface of the gap-filling sleeve 2 so as to ensure the centering of the rotor.

The fluid to be propelled enters the electric pump through ports 18 provided in the lower section of the gap-filling sleeve which lower section assumes in the embodiment illustrated in Fig. 4 the shape of a strainer secured to the carrier member of the step bearing 16 by means of bolts 19.

It is immediately apparent, upon examination of Fig. 4 that the fluid to be propelled follows the path illustrated by the arrows g and passes through the pumping rotor while a minimum hindrance opposes its flow. The fluid rises inside the pipe connected with the gap-filling sleeve 2 as soon as the pumping rotor begins to revolve.

Figure 5:
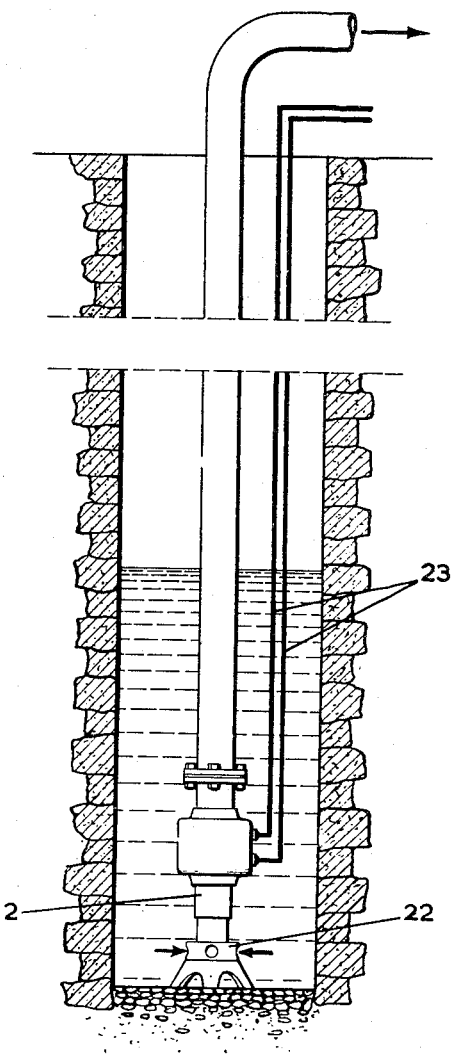
Fig. 5 is a diagrammatic elevational view of a complete electric pump, provided with a strainer and with a delivery pipe.

In order to better illustrate the possible and multiple applications of my improved electric pump, I have shown in Fig. 5 a modification wherein the electric pump is fitted at the lower end of a pipe that is to be immersed inside a well, for instance.

The stator which is then completely immersed should be completely covered by a protecting sheath of rubber for instance that is adapted to provide for its fluidtightness.

Inside the lower end of the gap-filling sleeve 2 is fitted a tubular section, the outer diameter of which is slightly smaller than the inner diameter of the sleeve and at the lower end of this tubular section is mounted a rose 22 through the openings of which the liquid to be pumped is constrained to pass; the leads 23 feeding current to the stator are also fluidtight.

The pump thus executed forms with the pipe 2 a sort of electric pump stick, the laying and repair of which are speedy by reason of the possibility of easily changing the stator.

Obviously, it is possible to modify the electric pump and the pumping rotor forming the object of my invention and to bring thereto any desired changes, additions or improvements without unduly widening thereby the scope of the invention as defined in the accompanying claims.

What I claim is:

1. A motor-pump comprising a fluid feeding pipe including a rectilinear portion of circular cross-section, an annular stator disposed around said rectilinear portion and secured to said pipe, means for energizing said stator, bearings inside said rectilinear portion, a rotor adapted to rotate inside said rectilinear portion with a slight clearance between said rotor and said rectilinear portion, said rotor being disposed around a spindle revolving inside said bearings and consisting of a first and a second one of two spaced electrically conductive plates, each one of said plates having a same number of passages provided therein, and of a number of tubular members of an electrically conductive material, equal to the number of passages provided in each of said plates, each one of said tubular members being helically wound around the axis of said rotor and connecting a passage provided in said first plate to a passage provided in said second plate.

2. A vertical motor-pump comprising a vertical rectilinear portion of pipe of circular cross-section, an annular stator disposed around said portion of pipe and secured to the same, means for energizing said stator, a stationary bearing disposed in the axis of said rectilinear pipe portion under the inferior extremity thereof for receiving a vertical spindle, a rotor adapted to rotate inside said rectilinear portion of pipe, said rotor being disposed around a vertical spindle, the inferior extremity thereof revolving inside said vertical bearing, and consisting of a first and a second one of two spaced electrically conductive plates, each one of said plates having a same number of passages provided therein, and of a number of electrically conductive tubular members, equal to the number of passages provided in each of said plates, each one of said tubular members being helically wound around the axis of said rotor and connecting a passage provided in said first plate to a passage provided in said second plate.

References Cited in the file of this patent

UNITED STATES PATENTS

| | | |
|---|---|---|
| 1,071,042 | Fuller | Aug. 26, 1913 |
| 1,485,186 | Harza | Feb. 26, 1924 |
| 1,996,460 | Coates | Apr. 2, 1935 |
| 2,312,848 | Pezzilo | Mar. 2, 1943 |

FOREIGN PATENTS

| | | |
|---|---|---|
| 345,574 | Great Britain | Mar. 26, 1931 |
| 656,111 | France | Dec. 24, 1928 |